United States Patent
Beish et al.

(10) Patent No.: US 7,617,074 B2
(45) Date of Patent: Nov. 10, 2009

(54) SUPPRESSING REPEATED EVENTS AND STORING DIAGNOSTIC INFORMATION

(75) Inventors: Phillip Beish, Duvall, WA (US); Shaun Eagan, Redmond, WA (US); Alexei Levenkov, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/774,347

(22) Filed: Jul. 6, 2007

(65) Prior Publication Data

US 2009/0012748 A1    Jan. 8, 2009

(51) Int. Cl.
*G06F 17/40* (2006.01)
(52) U.S. Cl. .......................... 702/187; 709/224; 714/39
(58) Field of Classification Search ................. 702/187; 714/39, 45–48; 709/224
See application file for complete search history.

(56) References Cited

U.S. PATENT DOCUMENTS

| | | | |
|---|---|---|---|
| 5,313,455 A | 5/1994 | van der Wal et al. | 370/13 |
| 5,533,193 A * | 7/1996 | Roscoe | 714/39 |
| 5,619,644 A | 4/1997 | Crockett et al. | 395/185.1 |
| 6,119,246 A | 9/2000 | McLaughlin et al. | 714/27 |
| 6,647,517 B1 | 11/2003 | Dickey et al. | 714/48 |
| 6,654,915 B1 | 11/2003 | Lu et al. | 714/57 |
| 7,137,144 B1 | 11/2006 | Attwood et al. | 726/13 |
| 7,149,928 B2 | 12/2006 | van Os | 714/38 |
| 2005/0005194 A1 | 1/2005 | Scanlan et al. | 714/13 |
| 2005/0198270 A1 | 9/2005 | Rusche et al. | 709/224 |
| 2005/0268187 A1 | 12/2005 | Meaney et al. | 714/723 |

OTHER PUBLICATIONS

Rogers, et al..; "z/*OS Diagnostic Data Collection and Analysis*"; http://wvvw.redbooks.ibm.com/redbooks/pdfs/sg247110.pdf; Aug. 2005; 270 Pgs.
Tucek, et al.; "*Automatic On-line Failure Diagnosis at the End-User Site* ";http://www.usenix.org/events/hotdep06/tech/prelim_papers/tucek/tucek_html/; Sep. 18, 2006; 7 Pgs.

* cited by examiner

*Primary Examiner*—Drew A Dunn
*Assistant Examiner*—Hien X Vo
(74) *Attorney, Agent, or Firm*—Merchant & Gould, P.C.

(57) ABSTRACT

Events that repeatedly occur during a detection period are intercepted and suppressed before being written to a log. When the same error has been detected a predetermined number of times within the detection period, the event logging for the event is suppressed for a suppression period. At the end of the suppression period an entry is made in the log summarizing the events during the suppression period. Additionally, diagnostic information relating to an application is collected and then stored within a high speed memory. Upon the occurrence of a triggering event, the diagnostic information from the high speed memory is stored within a data store for later use.

20 Claims, 4 Drawing Sheets

SUPPRESSING REPEATED EVENTS AND STORING DIAGNOSTIC INFORMATION

BACKGROUND

Software applications may use logs to record event information. Generally, the application specifies the events that trigger the event information being recorded in the log. For example, the event may relate to operation of the application, a security event, a system event and the like. The event log may be used to assist in identifying and diagnosing current problems, as well as helping to identify potential problems. Developers may also use trace logs to obtain more detailed operational flow of an application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Events that repeatedly occur during a detection period are intercepted and suppressed before being written to a log. When the same error has been detected a predetermined number of times within the detection period, the event logging for the event is suppressed for a suppression period. At the end of the suppression period an entry is made in the log summarizing the events during the suppression period. Additionally, diagnostic information relating to an application is collected and stored within a high speed memory. Upon the occurrence of a triggering event, the diagnostic information from the high speed memory is stored within a data store for later use.

DETAILED DESCRIPTION

Figure 1:
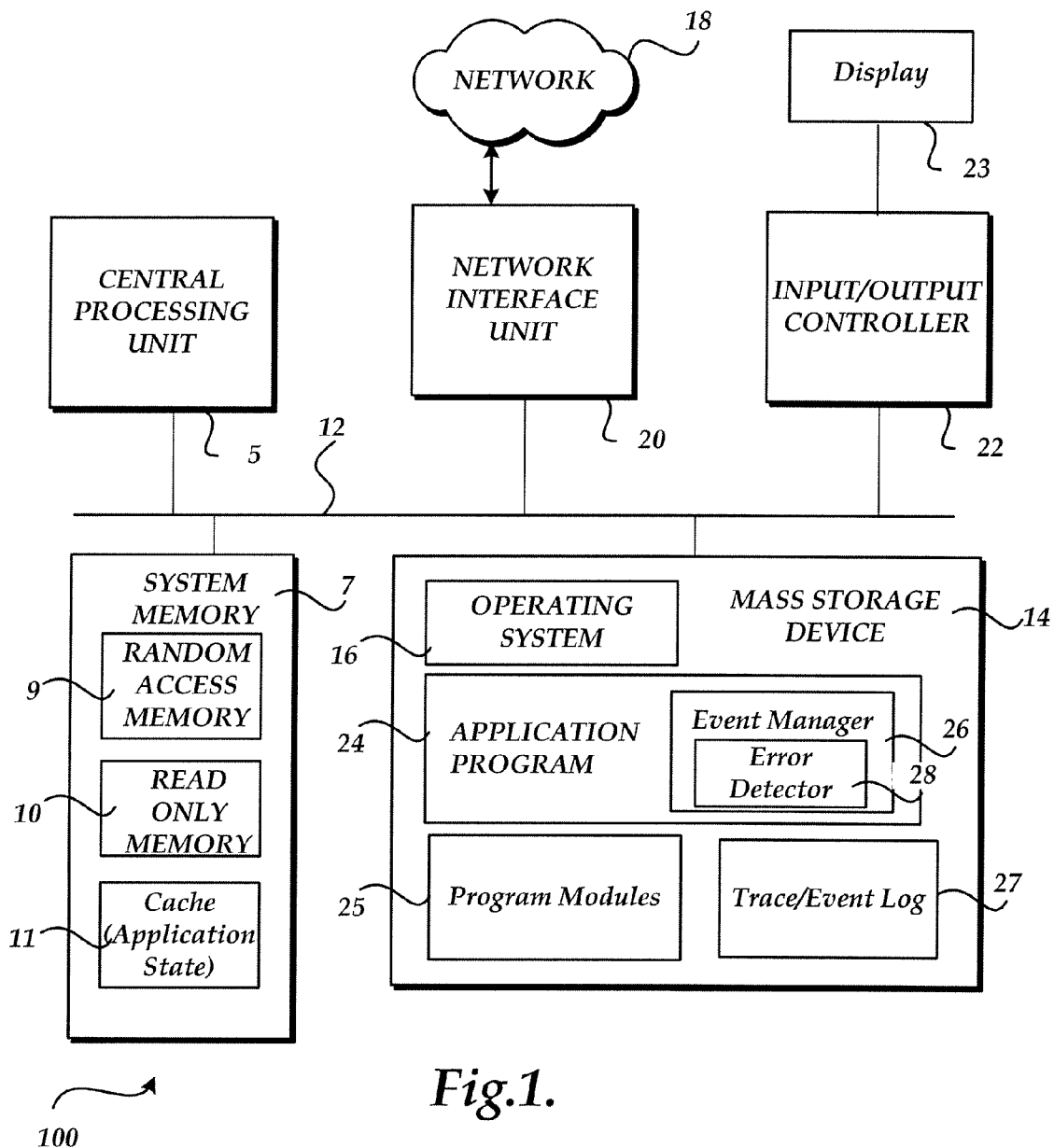
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM"), a read-only memory ("ROM") 10, a cache 11, and a system bus 12 that couples the memory to the central processing unit ("CPU") 5. System memory 7 provides volatile memory to computer 100.

A basic input/output system containing the basic routines that help to transfer information between elements within the computer, such as during startup, is stored in the ROM 10. The computer 100 further includes a mass storage device 14 for storing an operating system 16, trace/event log 27, application program(s) 24, and other program modules 25, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 23, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS® VISTA® operating system from MICROSOFT CORPORATION of Redmond, Wash. The mass storage device 14 and RAM 9 may also store one or more program modules. In particular, the mass storage device 14 and the RAM 9 may store one or more application programs 24. The trace/event log 27 is configured to store events and diagnostic information logged by applications (such as application program 24). Generally, the events that are written to log 27 are determined by the developers of the software program. The log may record many different types of events including both critical and non-critical events.

In conjunction with the operation of the application, application program 24 utilizes event manager 26 to manage event information. Generally, the event manager 26 is configured to collect diagnostic information relating to application program 24 and store the information within a high speed memory, such as cache 11. When a predefined event occurs, the cache 11 is flushed and the information is saved for later use. For example, the diagnostic information may be saved to trace/event log 27. Error detector 28 is configured to prevent the same event from being repeatedly written to trace/event log 27. Additional details regarding the event manager 26 will be provided below.

Figure 2:
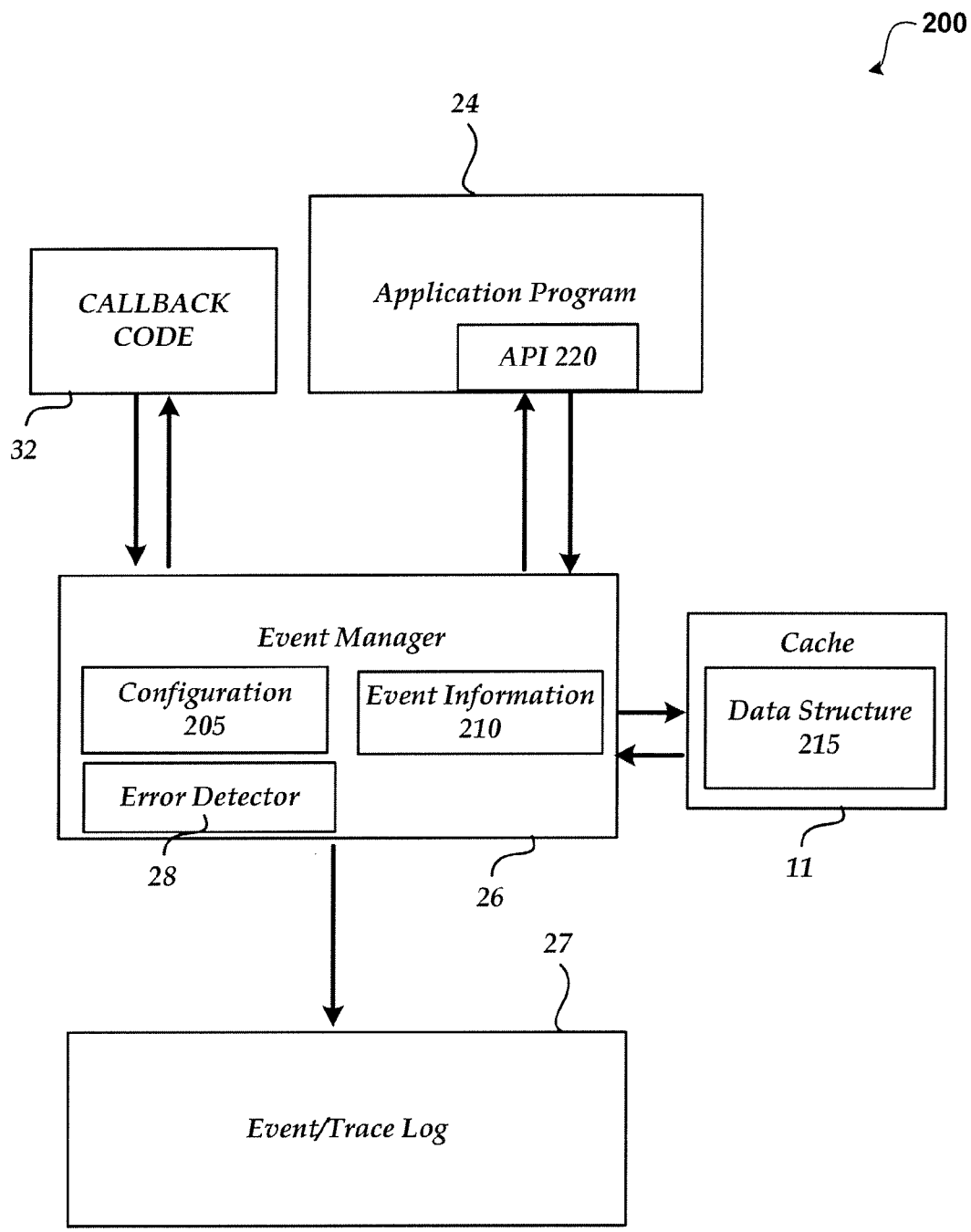
FIG. 2 shows a system for suppressing events and collecting and storing diagnostic information relating to an application.

FIG. 2 shows a system 200 for suppressing events and collecting and storing diagnostic information relating to an application. As illustrated, system 200 includes application program 24, callback code 32, event manager 26, cache 11 and event/trace log 27. In order to facilitate communication with the event manager 26, one or more callback routines, illustrated in FIG. 2 as callback code 32 may be implemented. According to one embodiment, application program 24 may use API (Application Programming Interface) to communicate with event manager 26.

Configuration 205 includes information that defines what events are to be monitored, what information should be collected and stored, as well as settings relating to a detection period, a suppression period and a threshold value that triggers suppression of errors. The configuration information may vary depending on the application. For example, one application program may be configured to record information relating to critical events, whereas another application may be configured to record information relating to non-critical events. The events may be categorized according to a type of event, or some other warning level scheme. For example, an event may be classified as a critical event, an error event, a warning event, and an information event. A critical event is an event that indicates an unexpected processing or an error condition. For example, a critical event may include a memory exception; a thread exception; a stack exception; a system hang exception and the like. An error event includes events that indicate an unexpected processing or an error condition. In this situation, the application was not able to perform a task as expected, but the application remains executing. A warning event indicates that a possible problem has occurred or may occur, but the application is still functioning correctly at the current point in time. An information event is any event in which information is desired. For example, these events may include state information for an application that may be useful in management of the application.

Event manager 26 is configured to store diagnostic information within data structure 215 within cache 11. This diagnostic information is low level information relating to the processing of application 24 that may be used for debugging and/or application optimization. This diagnostic information may also include flow events between processing activities and components. According to one embodiment, the information stored within cache 11 is for a predetermined period of time of operation of the application. For example, the information stored may be for the last two minutes, ten minutes, and the like. According to another embodiment, the amount of information stored within cache 11 is for a predetermined number of events. For example, the cache may be configured to store the last one hundred events, two hundred events, and the like. As the diagnostic information is initially stored within a high speed memory the application continues to operate normally without being bogged down by constantly logging the information to a slower memory device. The data is transferred to a permanent store, such as log 27, upon the occurrence of a triggering event. For example, when application 24 creates a triggering event, the data from data structure 215 is flushed from cache 11 and stored within event/trace log 27. The information may also be stored in some other data store. As discussed above, the triggering event may be specified to be any type of event. The API 220 provides a mechanism that allows a developer to define a triggering event, and how long the event should remain in effect. According to one embodiment, the API 220 includes default behavior to automatically treat the most severe errors as a triggering event. Once a triggering event is detected, event manager 26 notes the category of the event, the current time, and the current trace verbosity in data structure 215. Event manager 26 may also automatically adjust the current verbosity of the diagnostic information for the specified category to output all trace data (including Verbose messages that may have been previously disabled). Periodically, the event manager compares the current time with the time stored in the data structure to determine if the error condition is still in effect. When the error condition is not in effect, the verbosity may be returned to the previous level before the triggering event. According to another embodiment, the verbosity remains constant.

Event manager 26 is also configured to detect events that are repeatedly attempted to be written to event/trace log 27 using error detector 28. Generally, when an application is in a bad state it may attempt to repeatedly write events to event/trace log 27 making it difficult for an administrator to diagnose the problem. For example, the same error may be in the log fifty times. Error detector 28 detects repeated events and when detected prevents the errors from being repeatedly written to the event/trace log 27. The error detector keeps track of the number of events attempted to be written to the log over a period of time (the detection period). For example, the detection period may be one minute, five minutes, ten minutes and the like. According to one embodiment, the detection period is about three minutes. When error detector 28 detects that the same error has been attempted to be written to the log a predetermined number of times (the suppression threshold) within the detection period, the event logging for the event is suppressed from being written for a suppression period. According to one embodiment, the suppression period is for approximately twenty minutes. The suppression threshold may be configured for as little as two events within the detection period. During the suppression period, event manager 26 stores information relating to the event as well as the number of times the event is attempted to be written to the log. At the end of the suppression period a summary is written to the log that summarizes the number of times the event was attempted to be written. The summarizing event may also include other information, such as the times of the event, diagnostic information related to the event, and the like. API 220 provides a mechanism that allows a developer to define "spamming" and how long a "spam" condition should remain in effect. For instance, the application can specify rules for each category that specify how many events per detection period constitute "spamming", and how long to suppress events once the suppression threshold has been exceeded by setting the suppression period. According to one embodiment, the event manager suppresses events after three events occur within a single minute. Many other settings may be used.

Figure 3:
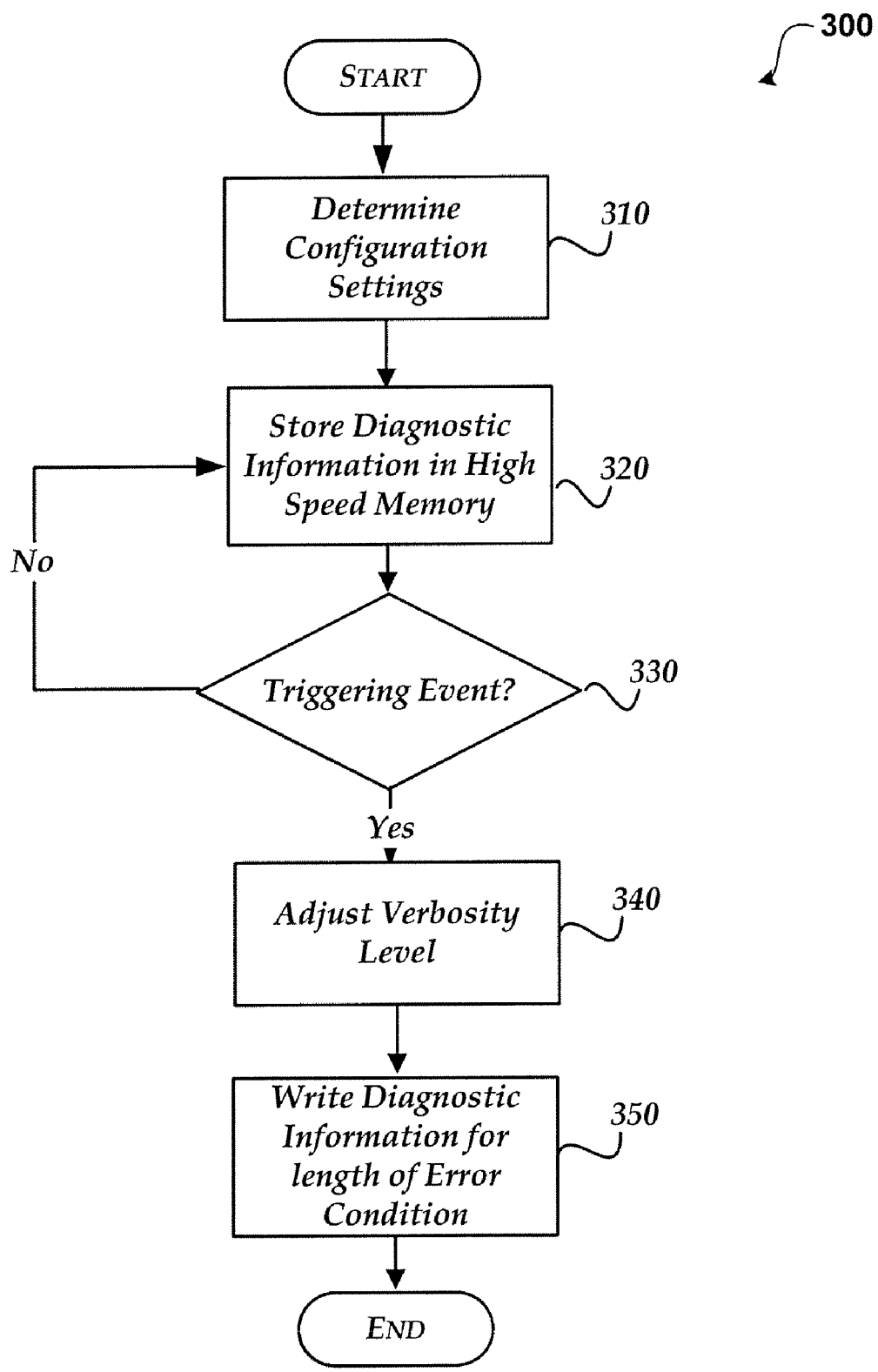
FIG. 3 illustrates a process for obtaining and storing diagnostic information.

Referring now to FIG. 3, an illustrative process 300 for obtaining and storing diagnostic information will be described. When reading the discussion of the routines and processes presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 310, where the configuration settings relating to the collecting and storing of diagnostic information is obtained. The settings may include default settings, user configured and/or a combination of default settings and user configured settings. As discussed above, the settings relating to storing diagnostic information generally include the event(s) to be monitored; a verbosity level of the information; and the length of the error condition.

Moving to operation 320, the diagnostic information is stored in a high speed memory, such as a cache. In this way, the application is not as affected as compared to writing to a slower speed memory device, such as a disk drive or some other data store. The diagnostic information is stored within a data structure in the high speed memory. According to one embodiment, the data structure is configured to store a predetermined amount of diagnostic information. For example, the data structure may be configured to store diagnostic information for a period of time (e.g. one minute, two minutes, five minutes . . . ); or the data structure may be configured to store a predetermined number of events (e.g. one hundred events, five hundred events, one thousand events . . . ) of operation of application 24. According to one embodiment, the amount of diagnostic information stored is configurable. Additionally, the size of the data structure may be adjusted in response to the occurrence of an event.

Flowing to operation 330, a determination is made as to whether a triggering event has occurred. As discussed above, a triggering event may be any type of event. When a triggering event has not occurred, the process returns to operation 320.

When a triggering event has occurred, the process moves to operation 340. According to one embodiment, the verbosity level for writing the diagnostic information is adjusted to a higher verbosity level in response to the triggering event. In this way, the diagnostic information includes more detailed diagnostic information during the time of the error condition.

Moving to operation 350, the information stored in the high speed memory is flushed and written to a data store. According to one embodiment, the diagnostic information is written to a trace log. As long as the process is within the configured length of the error condition the diagnostic information is output to the data store for later use. During this period, the diagnostic information may be directly written to the data store, or alternatively, the information may be stored within a high speed memory for the length of the error condition and then flushed at the end of the error condition or when the high speed memory is full. The process then flows to an end operation and returns to processing other actions.

Figure 4:
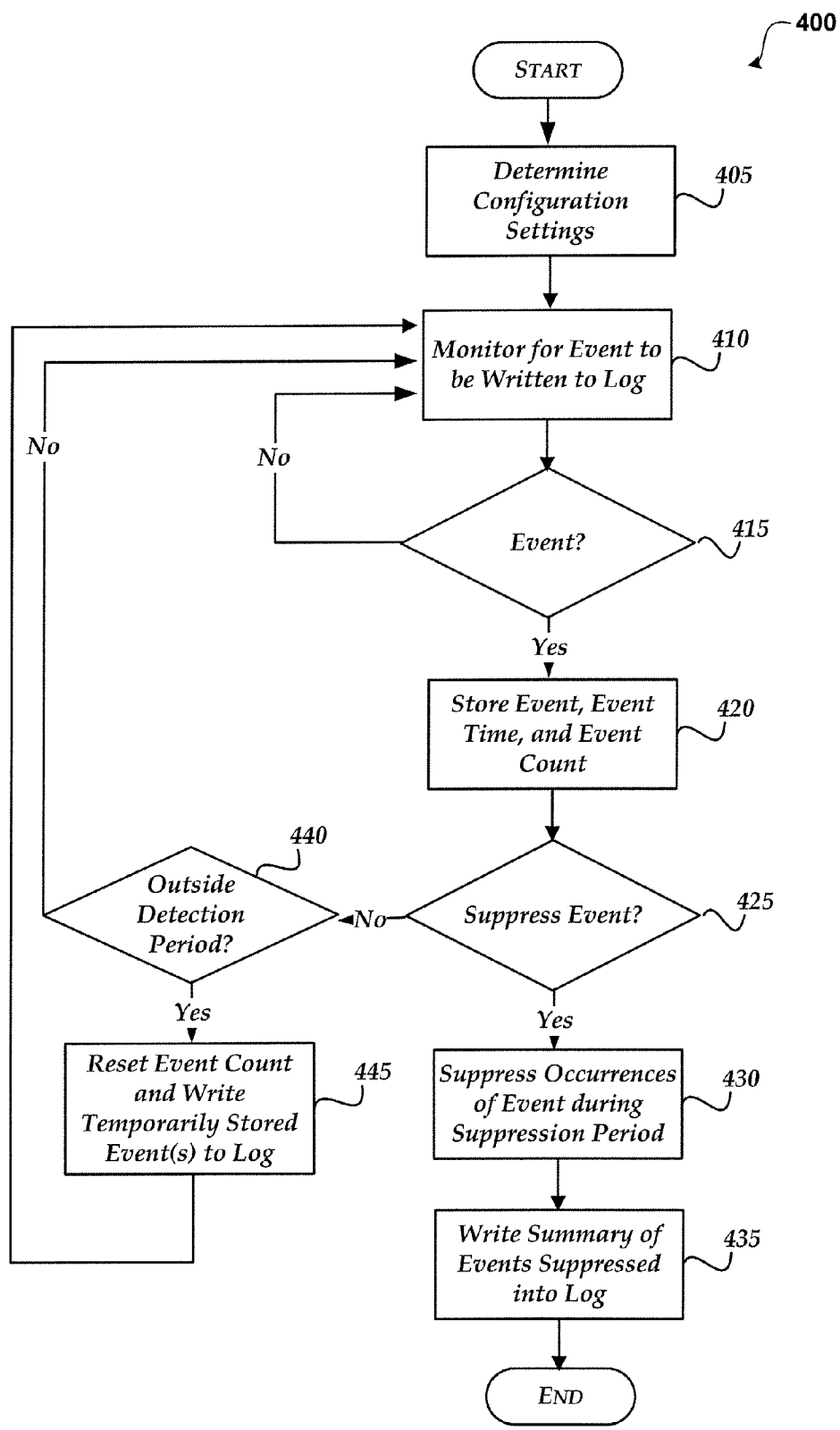
FIG. 4 shows a process for event suppression.

FIG. 4 shows a process 400 for event suppression.

After a start operation, the process flows to operation 405 where the configuration settings for the event suppression are determined. According to one embodiment, the settings include a detection period, a threshold value indicating the number of events triggering the suppression and a suppression period. Other configuration settings may also be included.

Moving to operation 410, the process monitors for any event that is to be written to a log, such as an error log.

Flowing to operation 415, a determination is made as to whether an event is to attempting to be written to the log. When an event is not to be written to the log, the process returns to operation 410 where the monitoring continues. When an event is to be written to the log, the process flows to operation 420 where information relating to the event is temporarily stored. According to one embodiment, the information includes the event, the time of the event as well as the number of times the event has occurred within the detection period.

Flowing to operation 425, a determination is made as to whether the event should be suppressed. According to one embodiment, the event is suppressed when the occurrences of an event has exceeded the threshold value during the detection period.

When the event is not to be suppressed, the process flows to operation 440 where a determination is made as to whether the time period for the event is outside of the detection period. When the event is outside of the detection period, the process flows to operation 445 where the event count is reset and the event(s) is written to the log. In this scenario, the event is not repeatedly attempting to be written to the log. The process then returns to operation 410 where the monitoring continues. When the event does not occur outside of the detection period, the process returns to operation 410.

When the event is to be suppressed, any occurrences of the event are suppressed during the specified suppression period. The process then moves to operation 435 where a summary of the events that were suppressed are written to the log. As discussed above, the summary may include the number of times the event occurred as well as a description of the event. The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method executing on a processor of a computing device for suppressing events written to a log stored on a computer-readable storage medium, comprising:
   determining when an event is to be written to the log on the computer-readable storage medium;
   determining a number of occurrences of the event during a detection period; wherein the determination includes using the processor to determine how many attempts have been made to write the event to the log during detection period; and
   suppressing the event from being written to the log on the computer-readable storage medium when the number of attempts to write the event to the log exceeds a suppression threshold; and
   writing the event to the log on the computer-readable storage medium when the number of attempts to write the event to the log is at or below the suppression threshold.

2. The method of claim 1, further comprising suppressing the occurrences of the event from being written to the log for a suppression period.

3. The method of claim 2, further comprising writing a summary of the suppressed event to the log after the suppression period; wherein the summary includes at least a number of times the event was attempted to be written to the log.

4. The method of claim 2, wherein determining how many attempts have been made to write the event to the log comprises determining how many attempts have been made to write the event to the log during the detection period of approximately twenty minutes.

5. The method of claim 2, further comprising storing the occurrences of the events within a temporary memory during the suppression period.

6. The method of claim 4, further comprising resetting the attempts to write the event to the log when an occurrence of the event occurs outside of the detection period such that the event is written to the log.

7. The method of claim 3, wherein the detection period, the suppression period and the event to be written to the log is defined within a configuration file.

8. A computer-readable medium having computer-executable instructions for collecting and storing diagnostic information, comprising:
   storing diagnostic information within a high speed memory during execution of an application;
   determining when a triggering event occurs;
   determining a number of occurrences of the triggering event during a detection period;
wherein the determination includes determining how many attempts have been made to write the diagnostic information within a high speed memory to a non-volatile memory;
   suppressing writing the diagnostic information that is stored within the high speed memory to a memory that is non-volatile when the number of attempts to write the diagnostic information exceeds a suppression threshold and, otherwise: writing the diagnostic information that is stored within the high speed memory to the non-volatile memory in response to the triggering event.

9. The computer-readable medium of claim 8, further comprising adjusting a verbosity level relating to the diagnostic information for a length of an error condition relating to the triggering event.

10. The computer-readable medium of claim 9, wherein storing the diagnostic information comprises storing a predefined amount of diagnostic information within the high speed memory.

11. The computer-readable medium of claim 9, wherein the diagnostic information is continually collected and stored within the high speed memory during the execution of the application.

12. The computer-readable medium of claim 9, wherein the triggering event, the length of the error condition; and the verbosity level is configurable by a user.

13. A system for storing diagnostic information and suppressing events, comprising:
   a processor and a computer-readable medium;
   a high speed memory;
   a volatile memory;
   a non-volatile memory;
   an operating environment stored on the computer-readable medium and executing on the processor; and
   an event manager operating under the control of the operating environment and operative to:
      store diagnostic information within the high speed memory;
      attempt to write the diagnostic information that is stored within the high speed memory to the non-volatile memory when a triggering event occurs;
      suppressing the writing of the diagnostic information from being written to the non-volatile information when the event has repeatedly occurred; wherein the writing of the diagnostic information for the event is suppressed for a suppression period; and
      writing a summary of the repeated occurrences of the events to the non-volatile memory after a suppression period; wherein the summary includes at least a number of times the event repeatedly occurred.

14. The system of claim 13, further comprising an Application Programming Interface (API) that is configured to interact with the event manager.

15. The system of claim 14, wherein suppressing the repeated occurrences of events from being written to the non-volatile memory comprises determining how many repeated occurrences have been made within a detection period.

16. The system of claim 15, further comprising storing each of the repeated occurrences of the event within the volatile memory during the suppression period.

17. The system of claim 14, wherein determining how many repeated occurrences have been made within the detection period comprises storing an event count within the volatile memory.

18. The system of claim 17, further comprising resetting the event count when an occurrence of the event occurs outside of the detection period.

19. The system of claim 14, further comprising adjusting a verbosity level relating to the diagnostic information for a length of an error condition relating to the triggering event.

20. The system of claim 14, wherein storing the diagnostic information comprises storing the diagnostic information within a data structure that is sized to store a fixed amount of the diagnostic information.

\* \* \* \* \*